United States Patent Office 3,098,857
Patented July 23, 1963

3,098,857
α-PHENYL - 4 - PYRIDINEMETHYL 2,2-DIMETHYL-3 - (2 - METHYLPROPENYL)CYCLOPROPYLCARBOXYLATE
Kurt J. Rorig, Glenview, Ill., assignor to G. D. Searle & Co., Chicago, Ill., a corporation of Delaware
No Drawing. Filed Nov. 3, 1961, Ser. No. 149,859
1 Claim. (Cl. 260—295)

This invention relates to aryl(cyclic amino)alkyl esters of heterocyclic and alicyclic carboxylic acids and to a process for their manufacture. More particularly, this invention relates to compounds of the formula

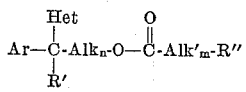

wherein Het designates a nitrogenous heterocyclic radical optionally alkylated or aralkylated; Ar designates hydrogen or an aromatic carbocyclic radical optionally alkylated, alkoxylated, or halogenated; R' designates hydrogen or an alkyl or phenyl radical; Alk and Alk' each designate a lower alkylene or alkenylene radical; $n$ and $m$ each designate 0 or the positive integer 1; and R" designates a furyl, thienyl, pyridyl, or optionally substituted cycloalkyl radical.

The application for Letters Patent securing the invention herein described and claimed is a continuation-in-part of applicant's prior copending application Serial No. 805,722, filed April 13, 1959.

Among the cyclic amino radicals represented by Het in the foregoing formula are pyridyl, piperidyl, pyrrolidyl, quinolyl, and tetrahydroquinolyl groupings. Of these groupings, those wherein the imino function is present can, in any given instance, be substituted on the nitrogen atom by especially a lower alkyl or an aralkyl radical. The lower alkyl radicals contemplated include methyl, ethy, propyl, isopropyl, butyl, isobutyl, sec-butyl tert-butyl, pentyl, isopentyl, tert-pentyl, neopentyl, hexyl, isohexyl, heptyl, octyl, and like $C_sH_{2s+1}$ radicals wherein $s$ is an integer amounting to less than 9. Illustrative of the aralkyl radicals occasionally present are such as benzyl and phenethyl groupings.

As to the aromatic carbocyclic radicals designated by Ar in the structural formula these are principally phenyl or naphthyl groupings which can comprise, in place of nuclear hydrogen, 1 or more straight- or branched-chain alkyl or alkoxy radicals, or halogen, or combinations of these substituents, the alkyl and alkoxy substituents ordinarily being of lower order, which is to say embracive of fewer than 9 carbon atoms.

The lower alkylene and alkenylene radicals represented by Alk and Alk' in the formula are bivalent acyclic straight- or branched-chain hydrocarbon moieties, saturated or containing not more than 1 double bond, and typified by methylene, ethylene, vinylene, trimethylene, propylene, 1,3-propenylene, tetramethylene, 2-methyl-1,3-propenylene, and 2,2-dimethyl-1,3-propylene groupings. It will be recognized that when $n$ or $m$ in the formula is 0, the apposed term drops out; and when both $n$ and $m$ are 0, the compounds referred to can be depicted

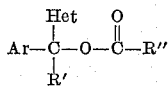

Het, Ar, R', and R" being defined as before.

R" in the formula depicts a heterocyclic radical of the type furyl, thienyl, and pyridyl, as aforesaid, except when it represents an alicyclic grouping, in which case R" can be such as cyclopropyl, cyclopentyl, cyclohexyl, and the like substituted ad libitum by particularly an isoalkenyl radical, for example, isopropenyl, isobutenyl, etc.

Equivalent to the basic amino esters of this invention for the purposes described are non-toxic acid addition and quaternary ammonium salts thereof, the compositions of which may be symbolized by

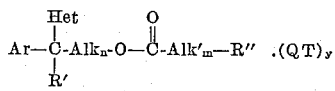

wherein Het, Ar, R', R", Alk, Alk', $n$, and $m$ have the meanings hereinbefore assigned; Q is selected from among hydrogen and lower alkyl, hydroxy(lower alkyl), and lower alkenyl radicals, as also such aralkyl radicals as benzyl, phenethyl, and naphthylmethyl; T is 1 equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in pharmaceutical dosage, and y is 1 except when R" contains a basic nitrogen, in which case $y$ is either 1 or 2.

The compounds herein disclosed are useful because of their valuable pharmacological properties. Thus, for example, they are characterized by eurhythmic and ataraxic effects.

The compounds to which this invention relates are preparable by a variety of methods, but the preferred procedure comprises contacting a carbinol of the formula

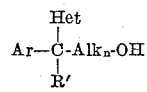

with an acid chloride of the formula

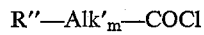

generally without solvent, but alternatively in benzene, toluene, xylene, or the like, and with anhydrous caustic, alkali or alkaline earth carbonate, pyridine or other tertiary base, or sodium hydride optionally present as an acid acceptor. The preparation usually requires from 3 to 24 hours at temperatures ranging from 35 to 165°, 1 to 6 hours at 100 to 140° being preferred where no solvent or catalyst is employed.

Conversion of the amine bases of this invention to equivalent acid addition salts is accomplished by simple admixture of these compounds with any of various inorganic or strong organic acids, the anionic portion of which conforms to T as hereinabove defined.

The quaternary ammonium compounds comprehended by this invention are those derived by contacting a claimed base with an organic ester of the formula

Q and T being limited by the meanings hereinbefore assigned, and it being additionally provided that Q is not hydrogen. Quaternization takes place in the temperature range between 45 and 100°, using an inert solvent such as chloroform, acetone, butanone, methanol, butanol, or the like as the reaction medium. Quaternization is ordinarily completed in from 1 to 48 hours and is generally carried out in a closed system if a lower alkyl halide—such as methyl chloride—is one of the reagents. Using methyl bromide, the manufacture of quaternary salt may be smoothly effected in butanone solution at 70°, the reaction time being approximately 1 hour.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications both of materials and of methods, may be practiced without departing from the purpose and intent of this disclosure. In the examples hereinafter detailed, temperatures are given in degrees centigrade, pressures in millimeters of mercury, and relative amounts of materials in parts by weight, except as otherwise noted.

Example 1

α-*Phenyl-4-pyridinemethyl 2-furoate.*—A mixture of 45 parts of α-phenyl-4-pyridinemethanol and 100 parts of 2-furoyl chloride is heated with vigorous agitation at 120–130° for 3 hours. The dark brown product is partitioned between 1000 parts of 5% aqueous caustic and 1500 parts of ether. The ether phase is extracted with 1000 parts of 5% aqueous hydrochloric acid. The acid extract is made basic by adding a slight excess of lye, and the organic ester which separates is taken up in 1500 parts of ether. The resultant solution is dried over anhydrous potassium carbonate and then vacuum distilled. The fraction coming over at 155–160° under 0.15 mm. pressure is the desired α-phenyl-4-pyridinemethyl 2-furoate, which solidifies on standing and melts at 70–72.5°. The product has the formula

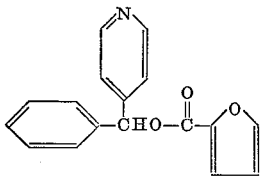

Example 2

α-*Phenyl-4-pyridinemethyl 3-furoate.* — Using essentially the technique set forth in the preceding Example 1, but substituting 100 parts of 3-furoyl chloride for the 2-furoyl chloride called for therein, one obtains α-phenyl-4-pyridinemethyl 3-furoate, of the formula

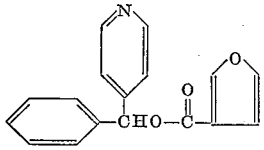

Example 3

α-*Phenyl-4-pyridinemethyl 2-thiophenecarboxylate.*—Using essentially the technique set forth in Example 1, but substituting 45 parts of 2-thiophenecarbonyl chloride for the 2-furoyl chloride called for therein, one obtains α-phenyl-4-pyridinemethyl 2-thiophenecarboxylate. The product boils in the range 175–185° under 0.15 mm. pressure. It has the formula

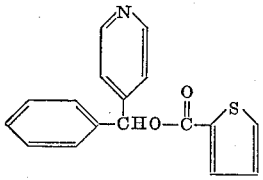

Example 4

α-*Phenyl-4-pyridinemethyl 3-thiophenecarboxylate.*—Using essentially the technique set forth in the preceding Example 3, but substituting 45 parts of 3-thiophenecarbonyl chloride for the 2-thiophenecarbonyl chloride called for therein, one obtains α-phenyl-4-pyridinemethyl 3-thiophenecarboxylate. The product has the formula

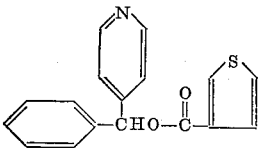

Example 5

α-*Phenyl-4-pyridinemethyl 2,2-dimethyl-3-(2-methylpropenyl)cyclopropylcarboxylate.*—A mixture of 93 parts of α-phenyl-4-pyridinemethanol and 103 parts of 2,2-dimethyl-3-(2-methylpropenyl)cyclopropanecarboxylic acid chloride (chrysanthemum monocarboxylic acid chloride) in 690 parts of pyridine is heated at the boiling point under reflux with agitation for 45 minutes, whereupon the pyridine is removed by vacuum distillation and the residue is thoroughly mixed with an excess of aqueous 10% caustic. This mixture is extracted with ether; and the ether extract is dried over anhydrous potassium carbonate and then stripped of solvent by distillation. The residual light brown oil is the desired α-phenyl-4-pyridinemethyl 2,2 - dimethyl - 3 - (2 - methylpropenyl)cyclopropylcarboxylate. The product is characterized by a menthol-like aroma. It has the formula

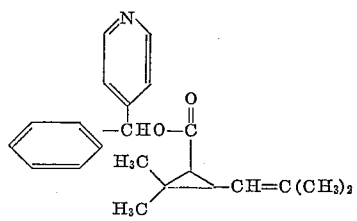

Example 6

α-*Phenyl-4-pyridinemethyl nicotinate dihydrobromide.*—Using essentially the technique set forth in the prceding Example 5, 93 parts of α-phenyl-4-pyridinemethanol and 120 parts of nicotinoyl chloride hydrochloride are reacted together in 1000 parts of pyridine for 4 hours to give α-phenyl-4-pyridinemethyl nicotinate, which melts at 56–58°. The base is taken up in hot absolute ethanol, and the resultant solution is made acid with hydrogen bromide dissolved in absolute ethanol. Anhydrous ether is then added, throwing down a granular ivory precipitate of α-phenyl-4-pyridinemethyl nicotinate dihydrobromide. The product, recrystallized from a mixture of ethanol and ether, melts at 162–165° (with gas evolution). It has the formula

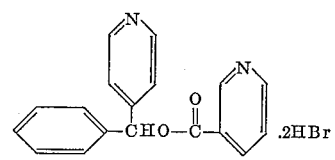

Example 7

α-*Phenyl-4-pyridinemethyl isonicotinate dihydrobromide.*—Using essentially the technique set forth in the preceding Example 6, but substituting 120 parts of isonicotinoyl chloride hydrochloride for the nicotinoyl chloride hydrochloride called for therein, one obtains α-phenyl-4-pyridinemethyl isonicotinate dihydrobromide, of the formula

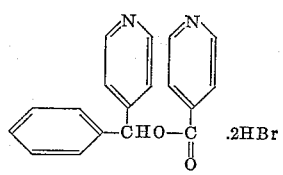

Example 8

α-*Phenyl-2-pyridinemethyl picolinate dihydrobromide.*—Using essentially the technique of Example 6, but substituting for the α-phenyl-4-pyridinemethanol and nicotinoyl chloride hydrochloride called for therein 93 parts of α-phenyl-2-pyridinemethanol and 120 parts of picolinoyl chloride hydrochloride, respectively, one obtains α-phenyl-2-pyridinemethyl picolinate dihydrobromide. The product has the formula
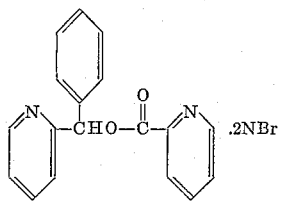
What is claimed is:
α-Phenyl-4-pyridinemethyl 2,2-dimethyl-3-(2 - methylpropenyl)cyclopropylcarboxylate.
References Cited in the file of this patent
UNITED STATES PATENTS
3,029,246     Rorig _____ Apr. 10, 1962
OTHER REFERENCES
Villani et al.: J. Org. Chem., vol. 17, pp. 249–54 (1952).